United States Patent [19]

Unuma et al.

[11] Patent Number: 4,836,430

[45] Date of Patent: Jun. 6, 1989

[54] PAPER FEED APPARATUS

[75] Inventors: Sadao Unuma, Yokonemachi; Masashi Yamashita, Aichi, both of Japan

[73] Assignee: Tokai Kogyo Kabushiki Kaisha, Japan

[21] Appl. No.: 157,697

[22] Filed: Feb. 19, 1988

[30] Foreign Application Priority Data

Feb. 20, 1987 [JP] Japan .................................. 62-24811

[51] Int. Cl.[4] ........................ B65H 20/20; B41J 11/26; G03B 1/30

[52] U.S. Cl. ........................................ 226/74; 226/76; 400/616.2; 400/616.3

[58] Field of Search .............................. 226/52, 74–86; 400/616–616.3

[56] References Cited

U.S. PATENT DOCUMENTS

| | | | |
|---|---|---|---|
| 4,428,519 | 1/1984 | Reichl et al. | 226/75 |
| 4,475,677 | 10/1984 | Rutishauser | 226/74 |
| 4,682,904 | 7/1987 | Yoshimura et al. | 400/616 |
| 4,742,946 | 5/1988 | Hamamichi et al. | 226/74 |

*Primary Examiner*—John Petrakes
*Attorney, Agent, or Firm*—Berman, Aisenberg & Platt

[57] ABSTRACT

A paper feed apparatus for a printer, having a belt type paper feed mechanism and a feed wheel both mounted on a frame. The belt type paper feed mechanism is of a construction in which a driving sprocket and two driven sprockets are arranged so that the respective rotational axes are positioned at the angles of a triangle, and in these positions the three sprockets are rotatably supported by the frame, and an endless belt is entrained about those sprockets. The endless belt has feed pins erected in a row at predetermined intervals on its outer peripheral surface. The feed wheel is supported by the frame rotatably about a rotational axis parallel to that of the driving sprocket in a position close to the same sprocket, and it has feed pins radially erected in a circumferential row at predetermined intervals on its outer peripheral surface. The driving sprocket and the feed wheel are driven synchronously so that the outer peripheral surface speed of the endless belt and that of the feed wheel being equal to each other.

5 Claims, 5 Drawing Sheets

PAPER FEED APPARATUS

BACKGROUND OF THE INVENTION

1. Field of the Invention:

The present invention relates to an apparatus for feeding paper to the printers used in computers, word processors, plotters, etc., as well as to various other printers.

2. Description of the Prior Art:

Paper having a row of feed perforations or holes along each of both side edges thereof is in many cases used as the paper for recording characters and patterns printed from the printers used in computers, word processors, plotters, etc. The feed perforations are formed at equal intervals on straight lines along both side edges of the paper in positions spaced a predetermined distance from the side edges.

Generally, in this type of apparatus for feeding paper to a printer, one endless belt mounted on a tractor is disposed in the position corresponding to each of both side edges of the paper along the path of the paper fed to the printer. Each of the endless belts are projectingly provided with a large number of feed pins in a row at the same intervals as the intervals of the feed perforations. Each endless belt is entrained between a driving sprocket and a driven sprocket or guide member. Upon rotation of the driving sprocket, the plural feed pins present on the rectilinear portion of the endless belt between the driving sprocket and the driven sprocket or guide member come into engagement with the feed perforations of the paper, whereby the paper is conveyed along the rectilinear conveyance path and fed to the printer.

According to a known apparatus for conveying paper along an arcuate conveyance path and feeding it to a printer, one disk-like feed wheel mounted on a tractor is disposed in the position corresponding to each of both side edges of the paper; a plurality of feed pins are provided projectingly on the peripheral surface of each such feed wheel; and the spacing of adjacent feed pins in the circumferential direction of the feed wheel is made equal to that of adjacent feed perforations of the paper, to convey the paper along an arcuate conveyance path.

In the above paper feed apparatus provided with endless belts, paper is conveyed only along the rectilinear conveyance path, and in the above paper feed apparatus provided with feed wheels, paper is conveyed only along an arcuate conveyance path. In some type of printers, such apparatus are difficult to mount. In both types of paper feed apparatus, moreover, in order to effect stable conveyance of paper it is necessary that at least three or four feed pins be simultaneously engaged with the feed perforations of paper to transfer the driving force of the endless belts or the feed wheels to the paper. In the paper feed apparatus provided with endless belts, such requirement can be satisfied by enlarging the distance between the axis of rotation of the driving sprocket and that of the driven sprocket, while in the paper feed apparatus provided with feed wheels, it can be satisfied by enlarging the diameter of the feed wheels. However, both methods lead to an increase in size of the paper feed apparatus.

SUMMARY OF THE INVENTION

It is the object of the present invention to provide a paper feed apparatus which has a large number of feed pins for engagement with the foregoing perforations formed in paper to transfer a large driving force to the paper at the time of feeding the paper and which is compact in size.

According to the present invention, in order to achieve the above-mentioned object, there is provided a paper feed apparatus in which an endless belt having feed pins projecting perpendicularly on the outer peripheral surface of the belt and a feed wheel having radially projecting feed pins are disposed in a frame of the tractor in positions adjacent to each other and both are driven synchronously so that the surface speed of the endless belt and the peripheral speed of the feed wheel become equal to each other.

In the present invention, the endless belt is entrained about both a driving sprocket rotatably journalled in the frame of the tractor and at least one driven sprocket rotatably journalled in the frame in parallel with the driving sprocket, and it has a plurality of feed pins projecting on the outer peripheral surface of the belt at the same intervals as that of the feed perforations of paper. Further, the feed wheel has a plurality of radially projecting feed pins on its circular outer peripheral surface at the same intervals as that of the feed perforations of paper, and it is journalled in the frame of the tractor rotatably about an axis of rotation which is parallel to the axis of rotation of the driving sprocket, in a position adjacent to the driving sprocket. The driving sprocket and the feed wheels are driven synchronously so that the surface speed of the endless belt and the peripheral speed of the feed wheel become equal to each other, whereby the driving force can be transferred to the paper in simultaneous engagement of both the projecting feed pins of the endless belt and those of the feed wheel with the feed perforations of the paper. Consequently, the number of the feed pins engaged with the paper feed perforations can be increased without increasing the length of the endless belt and the diameter of the feed wheel so much.

According to the present invention, paper is conveyed at the beginning along a rectilinear conveyance path by the endless belt, so the feed pins of the endless belt are fitted in feed perforations of paper in a stable condition, and then the paper is conveyed along a curvilinear path by the feed wheel, so the driving force of the feed wheel can be transferred to the paper through the paper feed perforation. Besides, since the endless belt and the feed wheel are driven synchronously so that the endless belt and the feed wheel are equal to each other in the peripheral speed, namely, in the moving speed of the feed pins, the paper can receive the driving force from both the endless belt and the feed wheel without fear of breakage of the feed perforations formed in the paper even in the case where the paper conveying speed is high. Further, since the overall length of the conveyance path consisting of rectilinear and curvilinear portions can be made long as compared with the entire size of the paper feed apparatus, the apparatus permits the formation of a relatively large number of feed pins for engagement with the feed perforations in a compact construction.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
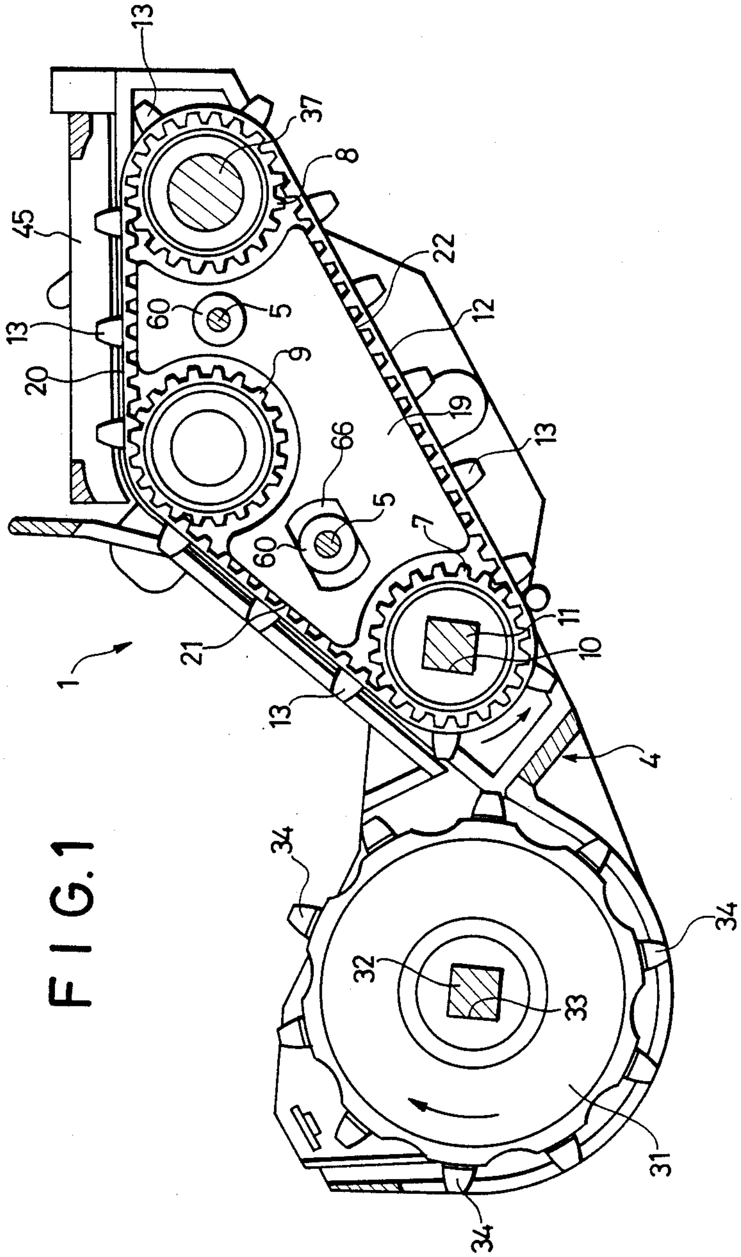
FIG. 1 is a sectional side view of a paper feed apparatus according to an embodiment of the present invention.

The drawings illustrate a paper feed apparatus (tractor) positioned in an opposed relation to one side edge of paper which has a row of feed perforations along each of both side edges. A frame body of this paper feed apparatus is indicated generally by the reference numeral 1. The frame body 1 comprises a generally flat plate-like outer frame 2, a first inner frame 3, with an endless belt driving mechanism being received between the outer frame 2 and the first inner frame 3, and a second inner frame 4, with a feed wheel 31 being received between the outer frame 2 and the second inner frame 4. These three frame members are interconnected to constitute the frame body 1 as a strong body. The inner frame is a frame member which faces paper being conveyed and the outer frame is a frame member which is positioned on the side opposite to the paper with respect to the inner frame. FIG. 1 shows an arrangement of the endless belt driving mechanism and the feed wheel 31, with the first and second inner frames 3, 4 and the outer frame 2 removed.

On the outer frame 2 are integrally provided a pair of studs 60 projectingly toward the first inner frame 3, the studs 60 each having a central hole. The free ends of the studs 60 are brought into abutment with the first inner frame 3 to provide a predetermined spacing between the frames 2 and 3, and a pair of bolts 5 are inserted through the central holes of the studs 60, further through the first inner frame 3, and a pair of nuts 6 are threadedly engaged with the bolts 5 to connect the first inner frame 3 to the outer frame 2. In the space formed between the outer frame 2 and the first inner frame 3 are disposed a driving sprocket 7 and driven sprockets 8 and 9 so that respective central axes of rotation 57, 58 and 59 are positioned at the angles of a triangle and are parallel to each other. The driving sprocket 7 is integrally provided axially on both ends thereof with boss portions 71 and 72 which are concentric with the rotational axis 57 of the sprocket 7; the driven sprocket 8 is integrally provided axially on both ends thereof with boss portions 81 and 82 which are concentric with the rotational axis 58 of the sprocket 8; and the driven sprocket 9 is integrally provided axially on both ends thereof with boss portions 91 and 92 which are concentric with the rotational axis 59 of the sprocket 9. The outer frame 2 is formed with axial holes 67, 68 and 69 along the rotational axes 57, 58 and 59, while the first inner frame 3 is formed with axial holes 77, 78 and 79 along the rotational axes 57, 58 and 59. The boss portions 71 and 72 of the driving sprocket 7 are rotatably supported in the axial holes 67 and 77; the boss portions 81 and 82 of the driven sprocket 8 are rotatably supported in the axial holes 68 and 78; and the boss portions 91 and 92 of the driven sprocket 9 are rotatably supported in the axial holes 69 and 79. The axial holes 68 and 78 are stepped holes each comprising a portion for supporting the boss portion 81 or 82 and a portion smaller in diameter, both hole portions being formed coaxially.

An endless belt 12 is entrained about the outer peripheries of the driving sprocket 7 and the driven sprockets 8 and 9 so as to provide driving connection. The outer peripheral surfaces of the sprockets 7, 8 and 9 and the inner surface of the endless belt 12 are formed with teeth which are engageable with each other in a known manner. The driving torque of the driving sprocket 7 is transferred to the endless belt 12 by the engagement of the teeth of the driving sprocket 7 with the teeth of the endless belt 12. Feed pins 13 are planted or integrally formed on the outer surface of the endless belt 12 approximately centrally of the width of the belt, in a row at the same pitch as that of the feed perforations formed along each side edge of paper to be conveyed, the feed pins 13 being brought into engagement with the feed perforations of the paper.

Axially on both sides of the driving sprocket 7 are disposed a ring plate 14 between the sprocket 7 and the outer frame 2 and another ring plate 14 between the sprocket 7 and the first inner frame 3. The ring plates 14 have each a central hole whose inside diameter is of a size capable of being loosely fitted on the boss portions 71 and 72, and they are supported rotatably by the boss portions 71 and 72 through said central holes. Each ring plate 14 has a base portion formed as an annular plate having an outer periphral edge which is concentric with the above central holes. The outside diameter of the said outer peripheral edge is a little larger than that of the teeth of the driving sprocket 7 and reaches a side end face of the belt portion of the endless belt 12 which is in engagement with the driving sprocket 7. Thus, the base portions of the ring plates 14 are positioned axially on both sides of the driving sprocket 7 to prevent lateral movements (in the axial direction of the driving sprocket 7) of the endless belt 12 engaged with the driving sprocket 7. The thickness of the base portion of each ring plate 14 is set so that the ring plate 14 can perform relative rotation with respect to the driving sprocket 7 and also the outer frame 2 and the first inner frame 3.

From the outer peripheral edge of each ring plate 14 is projecting and fixed at least one pin-like or arcuate anti-floating piece 17 extending toward the driving sprocket 7, and also fixed is a stopper piece 18 for abutment with a stopper formed at the upper edge of the outer frame 2 or the first inner frame 3 or in a position adjacent thereto, to hold the anti-floating piece 17 in a predetermined position. Preferably, the anti-floating piece 17 is formed of a material of low frictional resistance such as nylon, polyacetal resins or a composition based on these resins and, if necessary, the whole of each ring plate 14 may be integrally formed of such material. It was confirmed that the ring plate made of such materials shows friction coefficient of $0.1 \sim 0.4$ though depending on a mating material. The pin-like or arcuate anti-floating piece 17 extends to the upper surface of an edge part of the belt portion of the endless belt 12, and the lower surface of the anti-floating piece 17 facing the said belt portion is opposed to the upper surface of the belt portion in a slightly spaced relation. When the driving sprocket 7 is rotated, the ring plates 14 rotate together with the sprocket 7 by virtue of the friction between the central holes thereof and the boss portions 71, 72 and the friction between the faces of their base portions and the sprocket 7 or the endless belt 12. The endless belt 12 advances arcuately along the peripheral surface of the driving sprocket 7 and then leaves said surface rectilinearly in a tangential direction of the same surface. The anti-floating pieces 17 of the ring plates 14 abut the upper surface of the belt portion of the endless belt 12 in a position slightly entering the rectilinear portion of the endless belt 12 from the connection of the arcuate portion and the rectlinear portion of the belt, resulting in that the endless belt 12 is pressed toward the peripheral surface of the driving sprocket 7 by virtue of the friction between the ring plates 14 and the sprocket 7 or the endless belt 12 to prevent the belt 12 from moving radially outwards of the sprocket 7, or floating, under centrifugal force based on the rotating speed of the sprocket 7 and at the same time strengthen the engagement between the teeth of the endless belt 12 and that of the driving sprocket 7. Excess pressure of the anti-floating pieces 17 against the endless belt 12 would affect the driving force and damage the belt 12, so the stopper pieces 18 are each retained at a suitable point of the outer frame 2 or the first inner frame 3, or brought into engagement with the stoppers formed on those frames, to hold the anti-floating pieces 17 in predetermined positions.

Axially on both sides of the driven sprockets 8 and 9 are disposed ring plates 15 and 16 between the outer frame 2 and the first inner frame 3. The ring plates 15 and 16, like the base portion of the ring plate 14, are each provided with a central hole having an inside diameter capable of being loosely fitted on the boss portion 81 or 82 of the driven sprocket 8 or 9 and also provided with an outer peripheral edge having an outside diameter reaching a side end face of the belt portion of the endless belt 12, to prevent a lateral movement of the endless belt 12 engaged with the driven sprockets 8 and 9. The illustrated ring plates 15 and 16 are not provided with the anti-floating piece 17 and stopper piece 18 of the ring plates 14. If necessary, however, the ring plates 15 and 16 may also have an anti-floating piece and a stopper piece. It is preferable that the material of the ring plates 15 and 16 be the same as that of the ring plates 14.

The driving sprocket 7 is axially formed with a square hole 10 of a square section along its rotational axis, and a first driving shaft 11 of a square section connected to a driving motor (not shown) is inserted and engaged into the square hole 10. With rotation in one direction of the first driving shaft 11, the endless belt 12 entrained about the driving sprocket 7 and the driven sprockets 8 and 9 is so driven as to describe a generally triangular locus in which the belt portions between the sprockets 7–8, 8–9 and 9–7 are rectilinear. To support the inner peripheral surfaces of such rectilinear portions of the endless belt 12, a belt guide 19 having rectilinear guide portions 20, 21 and 22 is disposed between the outer frame 2 and the first inner frame 3. The belt guide 19 is in the form of a plate having a thickness smaller than the width of the endless belt 12, and it also has notched portions 63, 64 and 65 which are in the form of inwardly recessed arcs to space a slight distance from the driving sprocket 7 and the driven sprockets 8 and 9. The outer peripheral edge portion of the belt guide positioned between the notched portions 64 and 65 serves as the rectilinear guide portion 20 which supports the endless belt portion positioned between the driven sprockets 8 and 9. Likewise, the outer edge portion of the belt guide positioned between the notched portions 63 and 64 serves as the rectilinear guide portion 22 which supports the endless belt portion positioned between the driving sprocket 7 and the driven sprocket 8, and the outer edge portion positioned between the notched portions 63 and 65 serves as the rectilinear guide portion 21 which supports the endless belt portion positioned between the driving sprocket 7 and the drive sprocket 9. The belt guide 19 has two through holes 66 extending in its thickness direction, into which are inserted the two studs 60 respectively which are projectingly provided on the outer frame 2. In the presence of stepped portions 61 formed at the base portions of the studs 60, spacing is ensured between the outer frame 2 and the belt guide 19, while in the presence of lugs (not shown) formed on the first inner frame 3, spacing is ensured between the inner frame 3 and the belt guide 19. The belt guide 19 is supported between the frame 2 and 3 so that the rectilinear guide portions 20, 21 and 22 are positioned centrally of the endless belt 12. One of the through holes 66 (the right-hand one in FIG. 2) is formed as a circular hole for engagement with the one stud 60, while the other through hole 66 (the left-hand one in FIG. 2) is formed in an elongated shape in consideration of the production tolerance of the outer frame 2 and that of the belt guide 19.

The first inner frame 3 is integrally formed with a guide plate 50 projecting in the direction opposite to the outer frame 2, the guide plate 50 havin a rectilinear portion extending along the endless belt portion positioned between the driven sprockets 8 and 9, an arcuate portion extending along the endless belt portion engaged with the peripheral surface of the driven sprocket 9, and a rectilinear portion extending along the endless belt portion positioned between the driven sprocket 9 and the driving sprocket 7. The outer surface of the guide plate 50 serves as one guide face for the paper to be conveyed, which guide face is coplanar with the outer peripheral surface of the belt portion, assuming that the endless belt 12 is stretched without looseness around the sprockets 7, 8 and 9.

Figure 3:
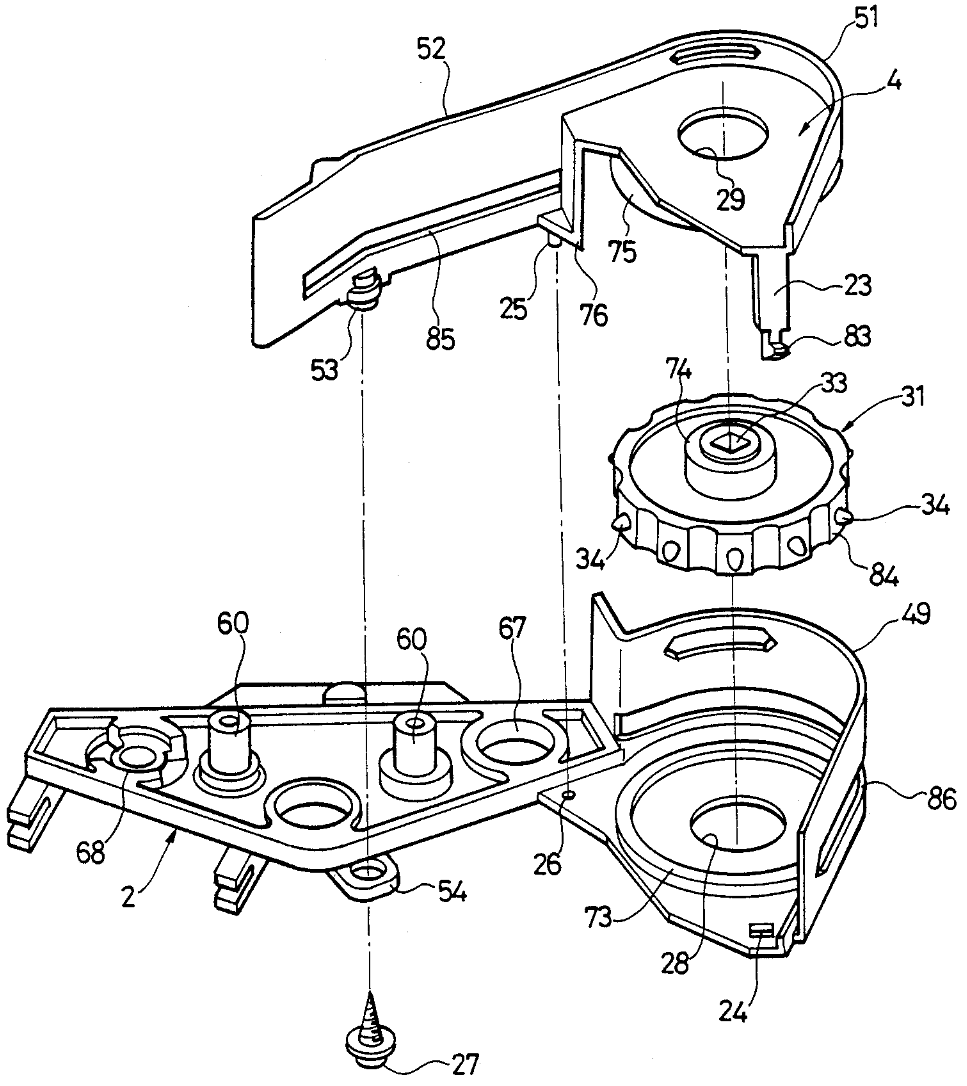
FIG. 3 is a perspective view showing a disassembled state of the outer frame and a second inner frame.

The second inner frame 4 is fixed to the outer frame 2 on the side of the axial hole 67 which is for supporting the boss portion 71 of the driving sprocket 7, in substantial contact with the first inner frame 3. The outer frame 2 is integrally formed with a bearing hole 28 for supporting one shaft portion of the feed wheel 31 rotatably, an annular projection 73 which is approximately concentric with the bearing hole 28, and an arcuate guide plate 49. The second inner fame 4 is integrally formed with a bearing hole 29 for supporting the other shaft portion 74 of the feed wheel 31, an annular projection 75 which is approximately concentric with the bearing hole 29, and an arcuate guide plate 51. It is further provided with retaining legs 23 and 76 projecting toward the outer frame 2. The arcuate guide plate 49 is upright from the outer frame 2 toward the second inner frame 4. The arcuate guide plate 51 projects from the inner frame 4 to the side opposite to the outer frame 2, extending up to the junction with the retaining leg 76, and it is positioned radially inside of the arcuate guide plate 49 in parallel with the latter. The free end of the retaining leg 23 is formed with a pawl portion 83 adapted to engage an engaging aperture 24 of the outer frame 2 and be held therein by the elastic force of the retaining leg 23, while the free end of the retaining leg 76 is formed with a positioning pin 25 adapted to fit in a fitting aperture 26 of the outer frame 2. By the engagement of these portions the bearing holes 28 and 29 are aligned with each other. Further, a rectilinearly extending guide plate 52 continuous to the guide plate 51 is formed with a projecting piece 53, while the outer frame 2 is also formed with a projecting piece 54, and both projecting pieces 53 and 54 are fixed together with a fastening screw 27 to thereby fix the second inner frame 4 to the outer frame 2 (see FIG. 3).

The shaft portion 74 of the feed wheel 31 is axially formed with a square through hole 33 along the rotational axis of the feed wheel 31, and a second driving shaft 32 having a square section is inserted and engaged into the square hole 33, the second driving shaft 33 being connected to a driving motor (not shown) and disposed in parallel with and spaced a predetermined distance from the first driving shaft 11. In consideration of the production tolerance of the outer frame 2 and that of the second inner frame 4, the bearing holes 28 and 29 which support the feed wheel 31 rotatably are set a little larger than the diameter of the shaft portion 74 of the feed wheel 31 in their length running along a straight line which connects the rotational axes of the first and second driving shafts 11 and 32. Feed pins 34 are formed on an outer peripheral portion 84 of the feed wheel 31 in a row at intervals equal to the pitch of the feed perforations formed along each side edge of the paper to be conveyed. Thus, the feed wheel 31 is positioned between the outer frame 2 and the second inner frame 4, loosely supported by the bearing holes 28 and 29, and rotated by the second driving shaft 32.

The feed wheel 31 is positioned so that its outer peripheral portion 84 is circumscribed with an extension line from the outer peripheral surface of the endless belt portion positioned between the driven sprocket 9 and the driving sprocket 7. Further, the feed wheel 31 is rotated by the second driving shaft 32 so that the surface speed of its outer peripheral portion 84 is equal to the feed speed of the endless belt 12 and the moving direction of the feed pins 34 is the same as that of the feed pins 13 of the endless belt 12. To this end, the second driving shaft 32 is driven synchronously through a gear mechanism so that it is rotated in the direction opposite to the rotating direction of the first driving shaft 11 while maintaining a predetermined speed ratio relative to the rotating speed of the first driving shaft 11.

Figure 4:
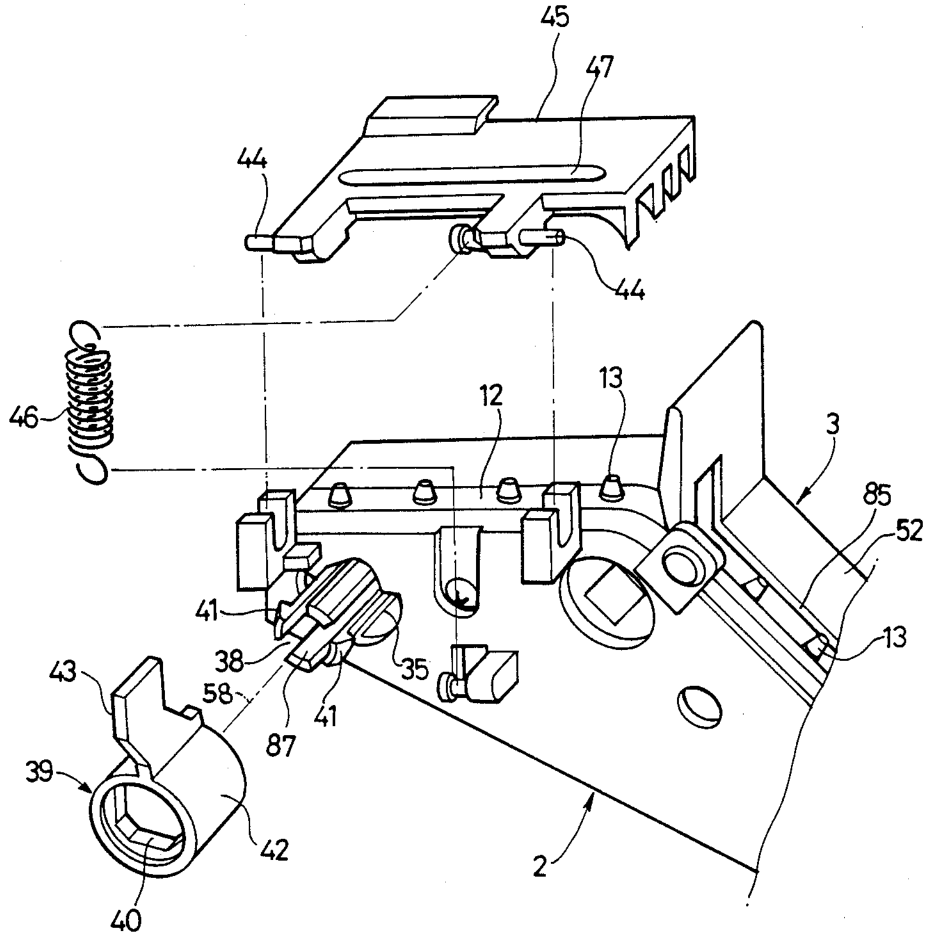
FIG. 4 is a perspective view showing a disassembled state of a paper pressing plate and a locking lever which are disposed between the outer frame and the second inner frame.
Figure 5:
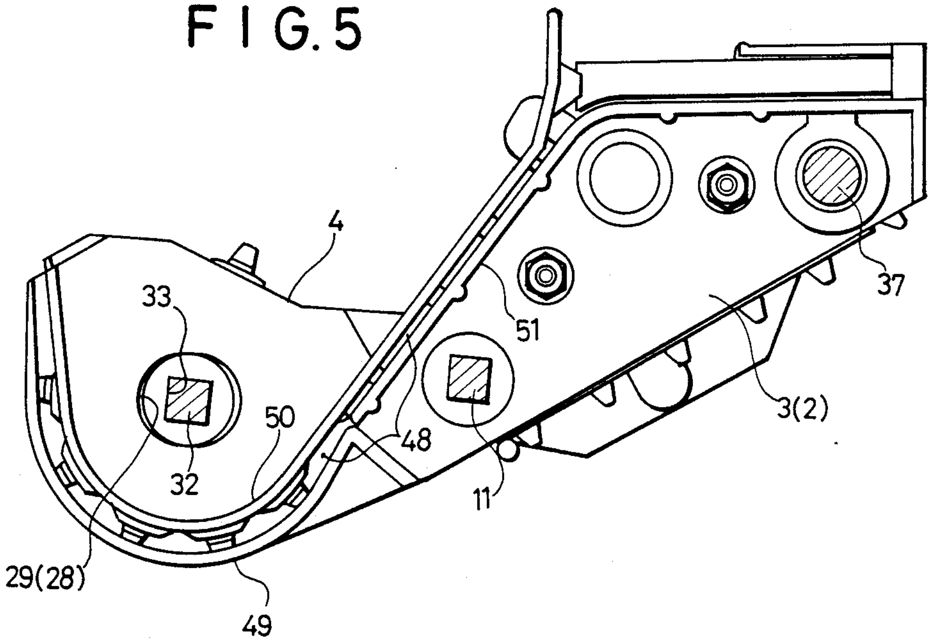
FIG. 5 is a side view of the paper feed apparatus.

A paper pressing plate 45 is pivotally connected to the end face of the outer frame 2 running along the endless belt portion positioned between the driven sprockets 8 and 9, the paper pressing plate 45 being pivoted about hinge pins 44 extending along the longitudinal direction of the endless belt 12 as shown in FIG. 4 so that it can be opened and closed toward the opposed end face of the first inner frame 3. The paper pressing plate 45 is normally disposed to span the end face portions of both frames 2 and 3 by means of a spring 46, thereby preventing the floating of the paper being conveyed.

In FIG. 1, the paper pressing plate 45 is opened against the resilience of the spring 46 and the feed perforations formed along one side edge of the paper to be conveyed are brought into engagement with feed pins 13 of the endless belt 12 thus exposed [the feed perforations formed along the other side edge of the paper are brought into engagement with another tractor (not shown)] and the paper pressing plate 45 is returned to its normal position in which it is held by the action of the spring 46. Thereafter, the driving sprocket 7 and the feed wheel 31 are rotated counterclockwise and clockwise as indicated by arrows in the figure by means of the first and second driving shafts 11 and 32, respectively, resulting in that each side edge portion of the paper is guided through the gap formed between the lower surface of the paper pressing plate 45 and the guide plate 50 of the first inner frame 3 while being retained by the feed pins 13 of the endless belt portion positioned between the driven sprockets 8 and 9. Then, when the endless belt portion travels between the driven sprocket 9 and the driving sprocket 7, the paper side edge portion is guided through the gap formed between the guide plate of the first inner frame 3 and the rectilinear guide plate 52 of the second inner frame 4 and is conveyed in a direction in which it is circumscribed with the outer peripheral portion 84 of the feed wheel 31. The endless belt 12 moves toward the driven sprocket 8 while being curved along the surface of the driving sprocket 7, while the paper side edge portion is guided toward the gap formed between the arcuate guide plates 49 and 51 formed on the outer frame 2 and the second inner frame 4, respectively. The feed perforations are disengaged from the feed pins 13 and come into engagement with the feed pins 34 of the feed wheel 31, whereby the paper is guided arcuately through the gap between the guide plates 49 and 51 and conveyed in the leftmost upward direction in FIG. 1. Thus, in the normal condition of paper conveyance, the paper which has been conveyed by the endless belt 12 travelling between the driven sprocket 9 and the driving sprocket 7 is transferred onto the feed wheel 31, then conveyed along the arcuate conveyance path and fed to the printer. When the endless belt 12 travels arcuately along the peripheral surface of the driving sprocket 7, it undergoes centrifugal force radially outwards, but the anti-floating piece 17 comes into abutment with the upper surface of the belt portion of the endless belt 12 to maintain the engagement of teeth between the endless belt 12 and the driving sprocket 7. In order to make as small as possible the gap between the lower surface of the paper pressing plate 45 and the upper surface of the belt portin of the endless belt 12 to thereby ensure smooth conveyance of paper, the paper pressing plate 45, and the guide plates 52 and 49 are formed with elongated holes 47, 85 and 86, respectively, which permit the movement of the feed pins 13 or 34.

Figure 2:
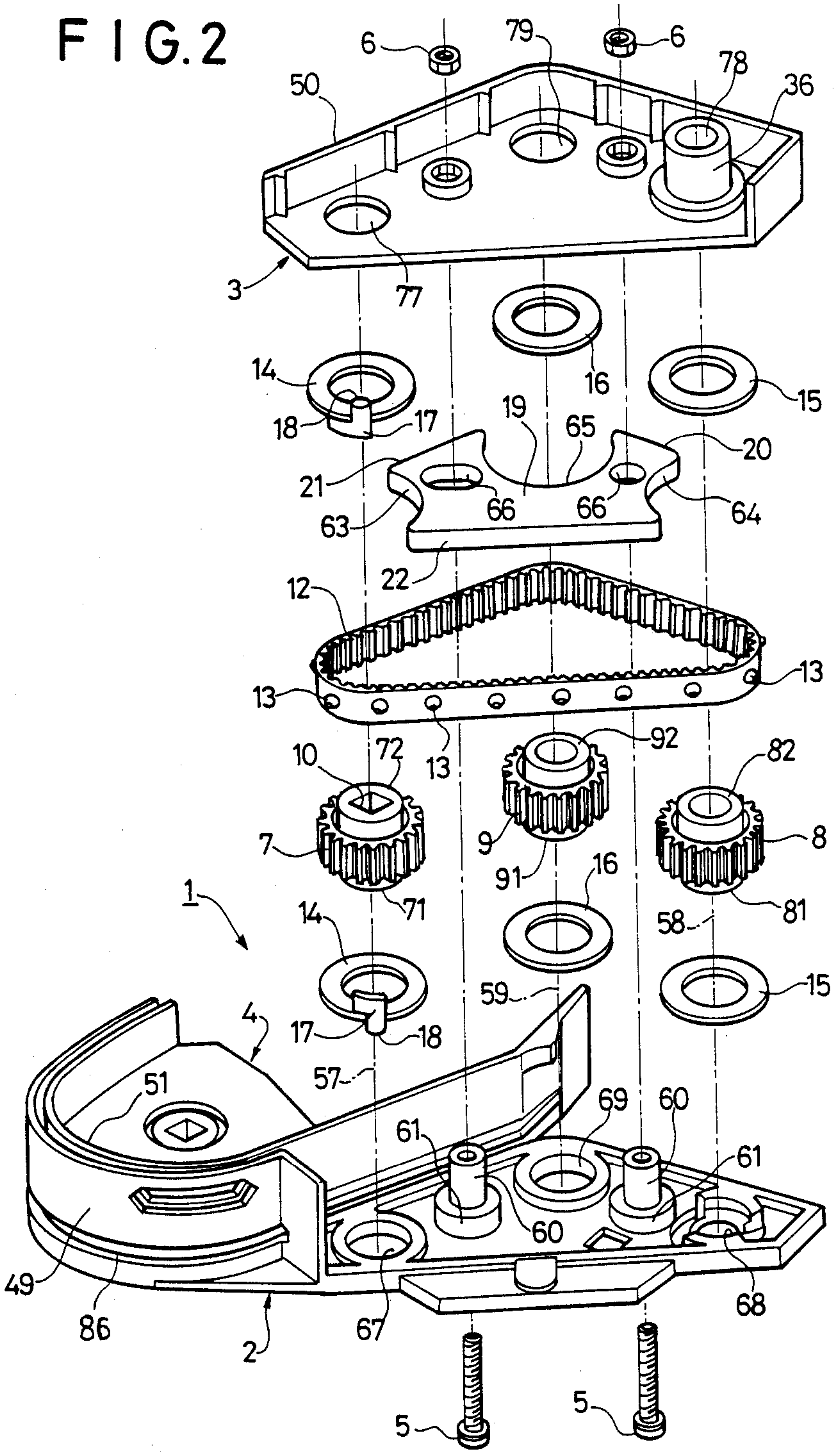
FIG. 2 is a perspective view showing a disassembled state of an outer frame and a first inner frame.

As shown in FIG. 2, a cylindrical support 35 centrally formed with an axial hole 78 is provided projectingly on the first inner frame 3 along the rotational axis 58 of the driven sprocket 8, while on the outer frame 2, as shown in FIG. 4, there is projectingly provided a clamping sleeve 35 formed with an axial hole 87 along the rotational axis 58. The clamping sleeve 35 has four slits 38 in the axial direction of the axial hole 87, that is, in parallel with the rotational axis 58. It is constructed of four elastic cantilevers. The free end of each cantilever is formed with a retaining pawl 41 projecting radially outwards with respect to the axis 58. A locking lever 39 having an annular boss portion 42 which is held by virtue of the elasticity of the cantilevers between the outside face of the outer frame 2 and the retaining pawls 41, is fitted on the outer periphery or the clamping sleeve 35. The annular boss portion 42 of the locking lever 39 is centrally formed with a square hole 40 of a square sectin along the axis 58, and the boss portion 42 has an operating handle 43 formed integrally on the outer peripheral surface thereof.

Figure 6:
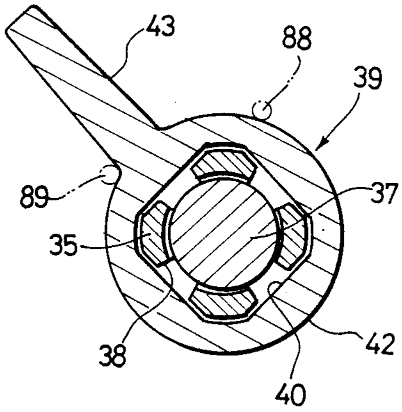
FIG. 6 is a sectional side view of the locking lever in an unlocked position.
Figure 7:
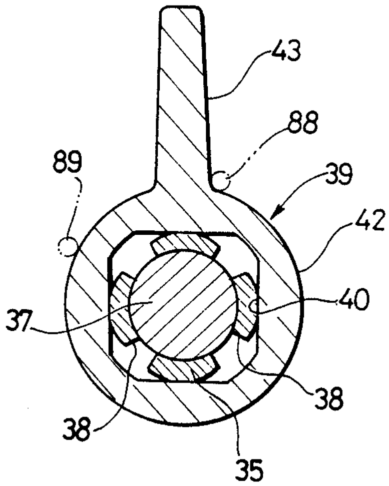
FIG. 7 is a sectional side view of the locking lever in a locking position.

The cylindrical support 36 and the clamping sleeve 35 are for fixing the outer frame 2 to a stationary part of the printer provided with a drive source (not shown) for the first and second driving shafts 11 and 32. The small-diameter portion of the axial hole 78 formed in the cylindrical support 36 fits substantially tightly on a support shaft 37 which is fixedly planted on the above stationary part in parallel with the driving shafts 11 and 32, while the axial hole 87 of the clamping sleeve 35 fits loosely on the support shaft 37. The four cantilevers of the clamping sleeve 35 are positioned in the four corners of the square hole 40 of a square section formed in the boss portion 42 of the locking lever 39 to support the outer frame 2 through the support shaft 37 (see FIG. 6). Thereafter, the operating handle 43 is turned 45° with respect to the axis 58, so that the square hole 40 of a square section displaces the four elastic cantilevers of the clamping sleeve 35 radially inwards with respect to the axis 58, thereby allowing the inner wall of the axial hole 87 of the clamping sleeve 35 to grip the outer peripheral surface of the support shaft 37 to effect fixing in that position (see FIG. 7). Stoppers indicated by the reference numerals 88 and 89 in FIGS. 6 and 7 are for indicating positions in which the clamping sleeve 35 grips and releases the support shaft 37.

In the paper feed apparatus of this embodiment, the components other than the bolts, nuts and springs can all be produced by molding from synthetic resins.

What is claimed is:

1. A paper feed apparatus for feeding paper to a printer, the paper having a row of feed perforations formed along each side edge thereof, said paper feed apparatus comprising:

a frame;

a belt type paper conveyance mechanism consisting of a driving sprocket rotatably journalled in said frame, at least one driven sprocket rotatably journalled in said frame in parallel with said driving sprocket, and an endless belt entrained about the said sprockets, said endless belt having a plurality of feed pins provided perpendicularly on the outer peripheral surface thereof at the same intervals as that of the feed perforations formed in the paper;

a ring plate disposed coaxially on at least one of both sides of said driving sprocket between said sprocket and an inner wall of said frame and mounted rotatably with respect to said sprocket and frame, said ring plate having an outer peripheral edge thereof extending beyond an outer diameter of said driving sprocket for preventing lateral movement of a portion of said endless belt engaging said sprocket and at least an anti-floating piece projecting from said outer peripheral edge toward an upper space of outer peripheral surface of an edge portion of said endless belt for preventing displacement of said portion of belt engaging said sprocket radially from said driving sprocket by virtue of centrifugal force;

a feed wheel provided in close proximity to said driving sprocket and rotatably supported by said frame about a rotational axis which is parallel to the rotational axis of the driving sprocket, said feed wheel having an outer peripheral surface portion concentric with said rotational axis thereof and also having feed pins formed at the same intervals along the peripheral surface portion thereof as that of the feed perforations of the paper and projecting radially from said outer peripheral surface portion; and a drive source including means for driving said driving sprocket and said feed wheel synchronously in such a manner that the surface speed of said endless belt and the peripheral speed of said outer peripheral surface portion of said feed wheel are equal to each other, whereby plural said feed pins of said endless belt and plural said feed pins of said feed wheel are simultaneously fitted in plural said feed perforations of the paper to transfer the driving force from said drive source, which is connected to said driving sprocket and said feed wheel, to the paper through the engagement of the feed pins with the feed perforations of the paper.

2. A paper feed apparatus according to claim 1, wherein said feed wheel is rotatably mounted on said frame so that said outer peripheral surface portion thereof is in a position in which it is circumscribed with an extension line of the outer peripheral surface of said endless belt entrained about said driving sprocket and said driven sprocket.

3. A paper feed apparatus according to claim 1 or claim 2, wherein said endless belt of said belt type paper conveyance mechanism is entrained about said driving sprocket and two driven sprockets rotatably journalled in said frame, said three sprockets having rotational axes positioned at the angles of a triangle, respectively.

4. A paper feed apparatus for feeding paper to a printer, the paper having a row of feed perforations formed at intervals along each side edge thereof, said paper feed apparatus comprising:

a frame;

a belt type paper conveyance mechanism consisting of a driving sprocket having a rotational axis and an outer diameter and rotatably journalled in said frame, at least one driven sprocket rotatably journalled in said frame in parallel with said driving sprocket, and an endless belt entrained about the said sprockets, said endless belt having an outer peripheral surface and a plurality of feed pins provided perpendicularly on said outer peripheral surface at the same intervals as those of the feed perforations formed in the paper;

a ring plate disposed coaxially on at least one of both sides of said driving sprocket between said sprocket and an inner wall of said frame and mounted rotatably with respect to said sprocket and frame, said ring plate having an outer peripheral edge thereof extending beyond the outer diameter of said driving sprocket for preventing lateral movement of a portion of said endless belt engaging said sprocket and at least an anti-floating piece projecting from said outer peripheral edge toward upper space of the outer peripheral surface of an edge portion of said endless belt for preventing displacement of said portion of belt engaging said sprocket radially from said driving sprocket by virtue of centrifugal force; and a feed wheel provided in close proximity to said driving sprocket and rotatably supported by said frame about a rotational axis which is parallel to the rotational axis of the driving sprocket, said feed wheel having an outer peripheral surface portion concentric with said rotational axis thereof and also having feed pins formed at the same intervals along the peripheral surface portion thereof as that of the feed perforations of the paper and projecting radially from said outer peripheral surface portion.

5. Paper feed apparatus according to claim 4, wherein said ring plate further comprises at least a stopper piece adapted to engage a portion of said frame for holding said anti-floating piece in a predetermined position.

* * * * *